(12) United States Patent
Rose

(10) Patent No.: US 10,337,929 B2
(45) Date of Patent: Jul. 2, 2019

(54) REMOTE COOKING REMINDER SYSTEM

(71) Applicant: Elmer Algin Rose, Grand Saline, TX (US)

(72) Inventor: Elmer Algin Rose, Grand Saline, TX (US)

( * ) Notice: Subject to any disclaimer, the term of this patent is extended or adjusted under 35 U.S.C. 154(b) by 0 days.

(21) Appl. No.: 16/122,727

(22) Filed: Sep. 5, 2018

(65) Prior Publication Data

US 2019/0072433 A1    Mar. 7, 2019

Related U.S. Application Data

(60) Provisional application No. 62/605,998, filed on Sep. 5, 2017.

(51) Int. Cl.
| | |
|---|---|
| *G01K 1/02* | (2006.01) |
| *H04L 12/28* | (2006.01) |
| *A47J 36/32* | (2006.01) |
| *H04L 12/44* | (2006.01) |

(52) U.S. Cl.
CPC ............ *G01K 1/024* (2013.01); *A47J 36/321* (2018.08); *H04L 12/2827* (2013.01); *H04L 12/44* (2013.01); *G01K 2207/02* (2013.01); *G01K 2207/06* (2013.01)

(58) Field of Classification Search
CPC .......... G01K 1/024; A21B 1/22; G08B 17/10; H04L 12/2827; H05B 1/02; H05B 3/00
USPC .............. 340/506, 577, 588, 628; 219/445.1, 219/446.1, 497, 506
See application file for complete search history.

(56) References Cited

U.S. PATENT DOCUMENTS

| | | | | |
|---|---|---|---|---|
| 6,043,461 A | * | 3/2000 | Holling | F24C 7/087 219/445.1 |
| 9,153,113 B1 | * | 10/2015 | Jones | G08B 17/10 |
| 2013/0146581 A1 | * | 6/2013 | Donarski | F24C 7/087 219/413 |
| 2016/0270154 A1 | * | 9/2016 | Cha | H05B 1/0266 |

\* cited by examiner

*Primary Examiner* — Hung T Nguyen
(74) *Attorney, Agent, or Firm* — The Keith Miller Law Group; Keith A. Miller

(57) ABSTRACT

A remote cooking reminder system for reminding a user of a heating apparatus condition while the user is in another room of a building. The remote cooking reminder system preferably comprises at least one sensor configured to activate at least one relay when a heating apparatus is energized, a transmitter electrically connected to the at least one relay where the transmitter is configured to send a signal when the at least one relay is activated, and at least one remote receiver configured to receive the signal and provide a reminder. The at least one remote receiver is preferably located in at least one room separate from the heating apparatus.

20 Claims, 4 Drawing Sheets

REMOTE COOKING REMINDER SYSTEM

CROSS REFERENCE TO RELATED APPLICATION

The present application is related to and claims the benefit under 35 U.S.C. § 119(e) of the prior U.S. provisional application Ser. No. 62/605,998 filed Sep. 5, 2017 entitled "Cooking Reminder System", the contents of which are incorporated herein by this reference in their entirety and are not admitted to be prior art with respect to the present invention by the mention in this cross-reference section.

BACKGROUND OF THE INVENTION

The present invention relates to the field of cooking notification systems. In particular, the present invention relates to a remote cooking reminder system configured to remind a user in other rooms of a residence that a stove, range burner, or other heating apparatus is turned on or energized.

According to statistics, the leading cause of fire in a residence is unattended cooking by up to 50%. Because of this obvious danger many attempts have been made to help people remember that the stove or oven is on. This has prompted many electric and spring-wound timers that make an audible sound when they time out or turn off. However, none of these set themselves automatically when the stove is turned on/energized. Sometimes the stoves themselves have timers that make a brief audible sound. However, these timers often don't work because they are not heard or were not set/used in the first place. Also, the person is often distracted or not even in the kitchen.

The current invention solves the problem outlined above by providing a remote cooking notification system configured to constantly notify a user that at least one burner is turned on, or active/energized, by transmitting a signal to a remote location within the residence such as a user's phone and/or the smoke detectors located within the residence.

Any discussion of prior art throughout the specification should in no way be considered as an admission that such prior art is widely known or forms part of the common general knowledge in the field.

BRIEF SUMMARY OF THE INVENTION

According to one object of the present invention there is provided a remote cooking reminder system comprising a sensor configured to activate at least one relay when a heating apparatus is energized, a transmitter electrically connected to said relay, where the transmitter is configured to send a signal when the relay is activated, and at least one remote receiver configured to receive said signal and provide a reminder, where the at least one remote receiver is located in at least one room separately from the heating apparatus.

According to another object of the present invention there is provided a remote cooking reminder system where the reminder is a visual notification, an audible notification or a combination of both, that is transmitted to a remote receiver in another room.

According to another aspect of the present invention there is provided a remote cooking reminder system where the at least one remote receiver is integrated into an existing smoke detector or other similar existing device.

According to another aspect of the present invention there is provided a remote cooking reminder system where the signal is a wireless signal.

According to another aspect of the present invention there is provided a remote cooking reminder system where the at least one relay and the transmitter are housed in a module outside of the heating apparatus, where the module is electrically coupled to the heating apparatus.

According to another aspect of the present invention there is provided a remote cooking reminder system further comprising a switch configured to change the constant signal from a wireless signal to a hardwired signal.

BRIEF DESCRIPTION OF THE DRAWINGS

The preferred embodiment of the present invention will now be described, by way of example only, with reference to the accompanying drawings in which.

DETAILED DESCRIPTION OF THE INVENTION

The foregoing and other objectives, features, and advantages of the invention will be more readily understood upon consideration of the following description of the invention taken in conjunction with the accompanying drawings.

Figure 1:
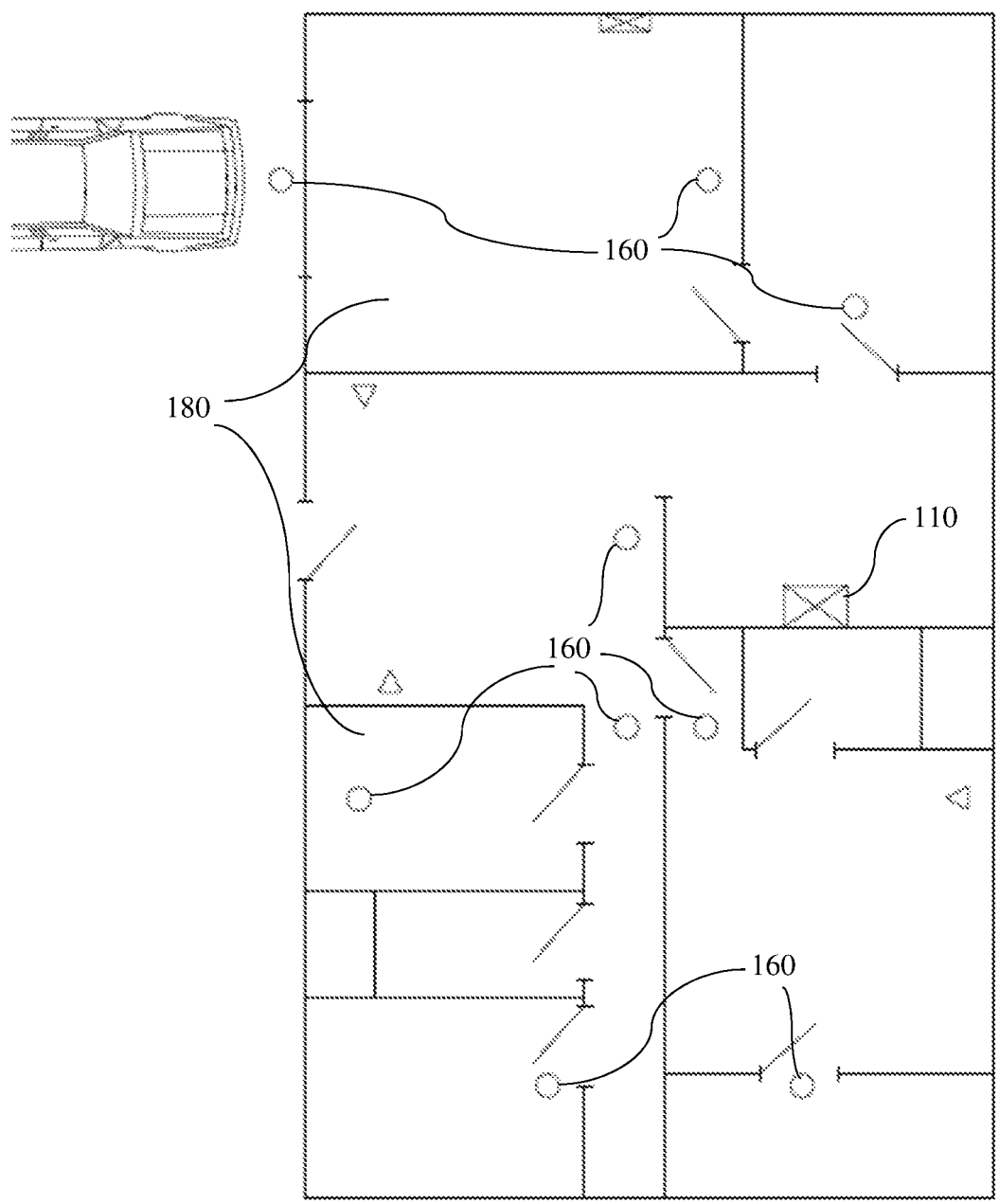
FIG. 1 shows a top view house plan view of a Remote Cooking Reminder System according to the preferred embodiment of the present invention.
Figure 2:
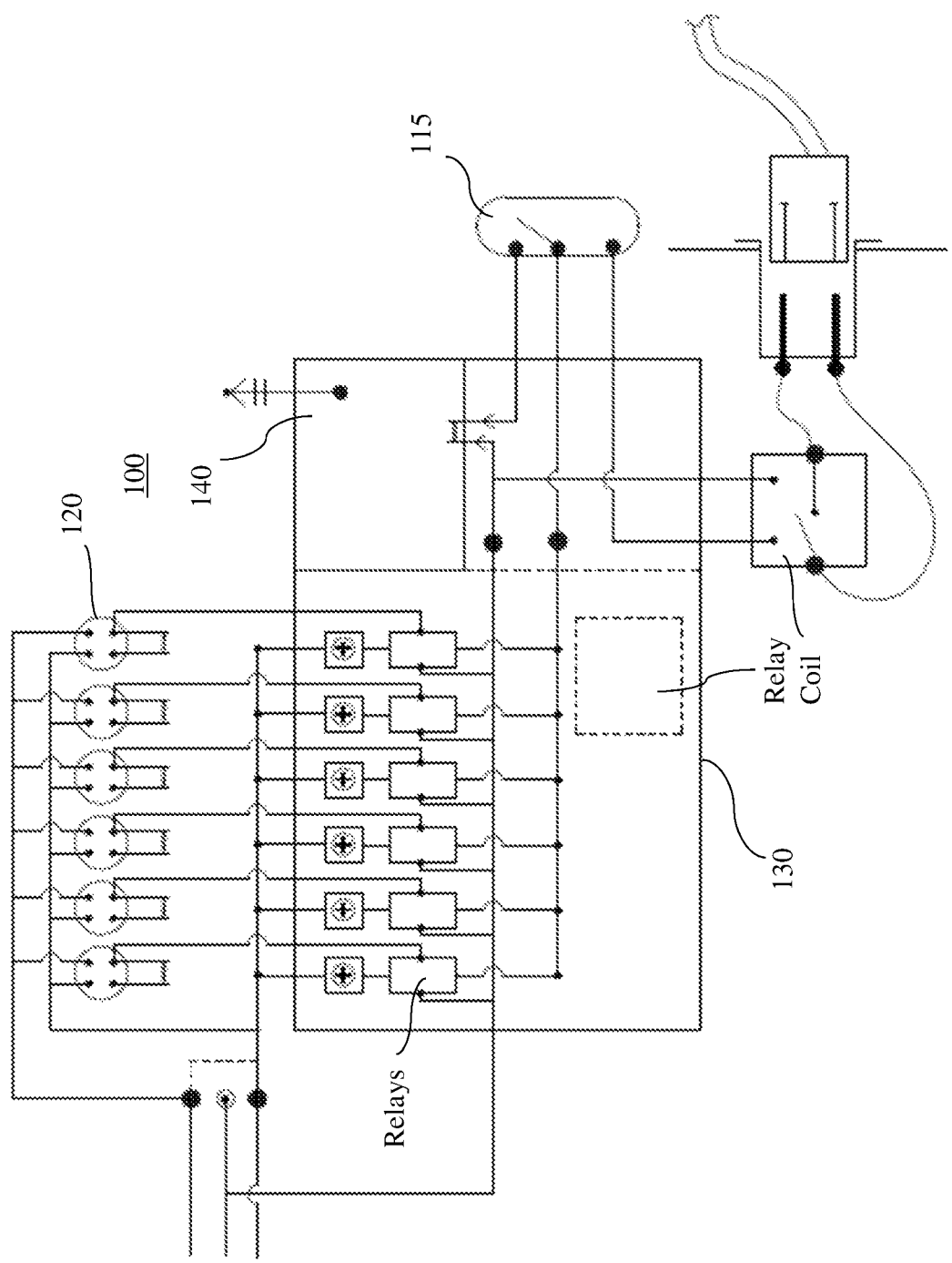
FIG. 2 shows an electrical diagram of a Remote Cooking Reminder System according to the preferred embodiment of the present invention.
Figure 3:
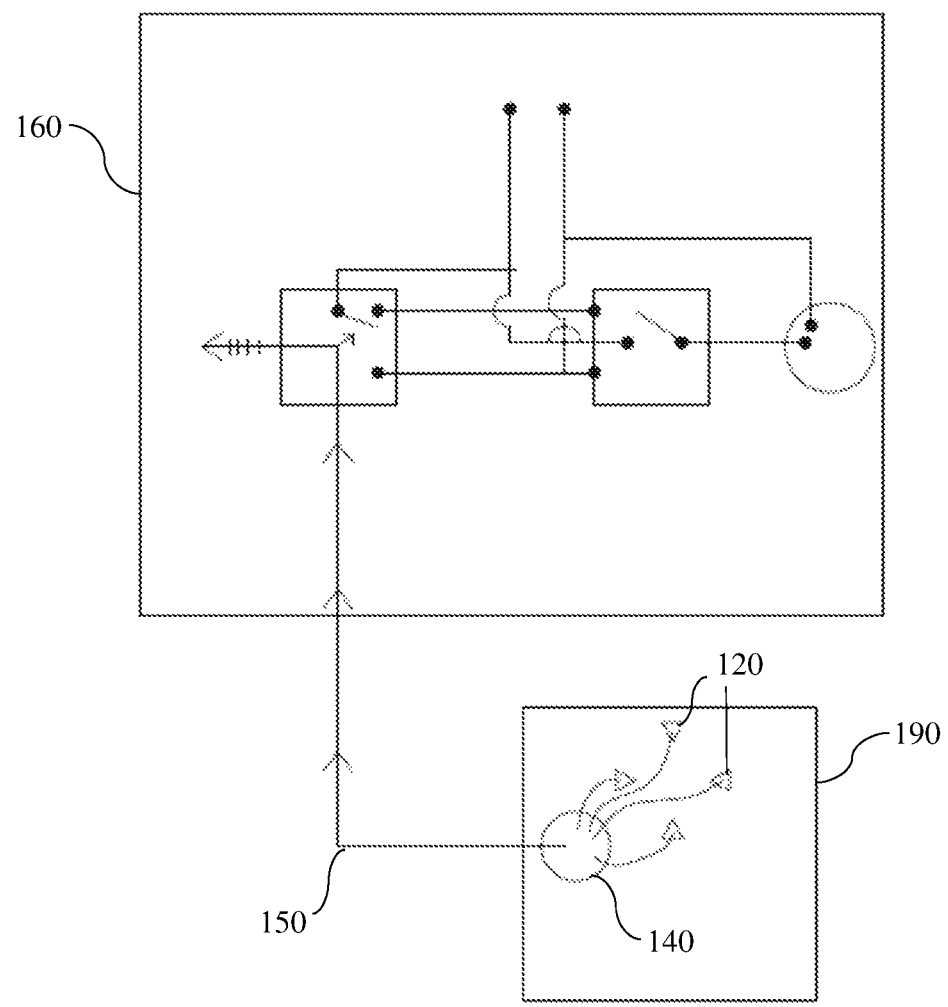
FIG. 3 shows an electrical diagram of a Remote Cooking Reminder System according to an alternate embodiment of the present invention.
Figure 4:
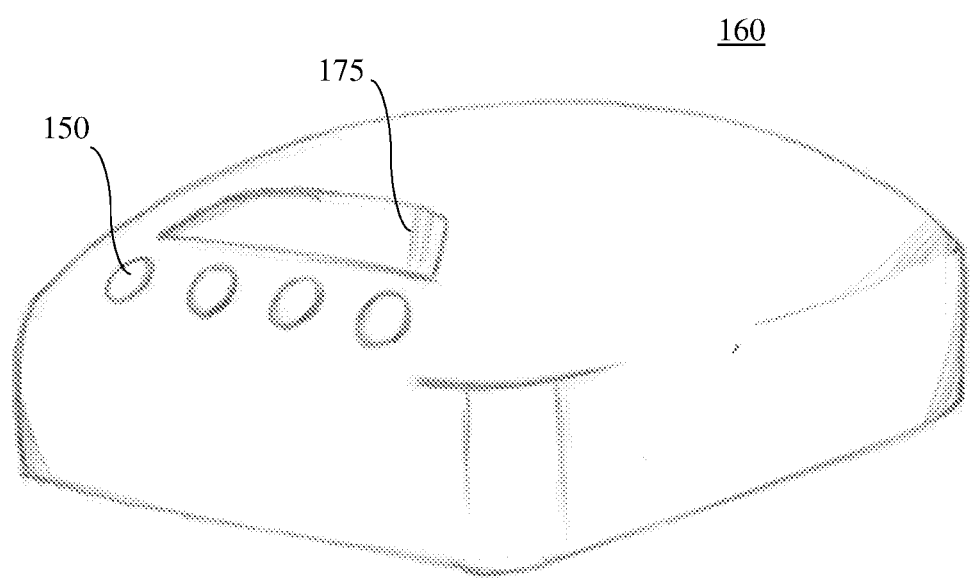
FIG. 4 shows a perspective view of a remote receiver for a Remote Cooking Reminder System according to the preferred embodiment of the present invention.

Referring now to FIG. 1-3, there is shown a remote cooking reminder system for reminding a user of a heating apparatus condition. While the heating apparatus 110 may be a stove, other heating apparatuses are contemplated. For example, it should be understood that the remote cooking reminder system may be configured to monitor ovens of all types, grills, fryers, or the like. The remote cooking reminder system preferably comprises at least one sensor 120 configured to activate at least one relay 130 when a heating apparatus 110 is energized, a transmitter 140 electrically connected to the at least one relay 130 where the transmitter is configured to send a signal 150 when the at least one relay is activated, and at least one remote receiver 160 configured to receive the signal 150 and provide a reminder 170 to a user. Preferably the at least one sensor 120, at least one relay 130, and the transmitter 140 are integral to the heating apparatus 110 and wired in electrical combination within the heating apparatus as shown in FIG. 2. Additionally, the at least one remote receiver 160 is preferably located in at least one room 180 separate from the heating apparatus as shown in FIG. 1.

In an alternate embodiment as shown in FIG. 3, the at least one relay 130 and the transmitter 140 are preferably housed in a separate module 190 outside of the heating apparatus 110, where the module is electrically connected to the heating apparatus 110. The module 190 is preferably hardwired to the heating apparatus 110. However, the module 190 may be wireless and plugged into a wall socket nearby the heating apparatus 110.

The signal 150 is preferably a wireless signal using a standard radio frequency (RF) signal transmitted to the remote receiver 160. The remote receiver 160 receives the signal 150 and activates the reminder 170. However, other types of wireless signals may be contemplated for the present invention, such as Bluetooth, wifi, and the like. The signal 150 is preferably a continuous signal sent to the remote receiver. In an alternate embodiment, the signal 150 is preferably a pulsing transmission.

Additionally, in an alternate embodiment, the heating apparatus 110 preferably further comprises a switch 115 configured to change the signal 150 from a wireless signal to a hardwired signal. In the embodiment where the at least one relay and the transmitter are housed in the module, the module further comprises a switch 115 configured to change said signal from a wireless signal to a hardwired signal. In this alternate embodiment, the remote receiver is preferably hardwired to the transmitter through the electrical wiring. The hardwire in this instance is preferably the residence electrical system, including the heating branch circuit. In an alternate embodiment, the hardwire is preferably an independent electrical circuit in the residence electrical system.

The at least one sensor 120 is preferably a heat sensor configured to detect when the heating apparatus 110 is energized or turned on and producing heat. Alternately preferably, the at least one sensor 120 is configured to detect when power is applied to the heating apparatus 110, such as an electrical current. Alternately preferably, the at least one sensor 120 is a heating apparatus indicator light where an indicator light is configured to illuminate when the heating apparatus 110 turns on and dealuminates when the heating apparatus is turned off, such as the indicator light on a stove top burner for example.

The reminder 170 is preferably a visual notification, such as provided by an LED or other type of light. Alternately preferably, the reminder 170 is an audible notification, but any such audible or visual indicator may be used as the reminder 170. The reminder 170 is preferably constantly illuminated or audible when the signal 150 is being received by the at least one remote receiver 160. Alternately preferably, the reminder 170 is pulsed in an on/off variable intensity/sound.

As further shown in FIG. 1, the at least one remote receiver 160 is preferably integrated into other existing devices common in various rooms within a residence. Examples of such existing devices include, but are not limited to, smoke detectors, alarm clocks, night lights, lamps, ceiling fans, and other devices common to residences. Alternately preferably, the at least one remote receiver 160 is a separate module, where the at least one remote receiver 160 can be powered by a battery, or other suitable power source, or plugged into an existing wall outlet.

In an alternate embodiment, the remote cooking reminder system 100 further comprises an internal timer in operable communication with the at least one sensor 120, where the internal timer is configured to count up starting when the at least one sensor 120 detects that the heating apparatus 110 has been energized or turned on. In this alternate embodiment, the at least one remote receiver 160 preferably further comprises an output display 175 of the internal timer so that a user can see how long the heating apparatus 110 has been energized, or in an operating state.

The at least one remote receiver 160 preferably further comprises a manual shut off means configured to de-energize the heating apparatus. The manual shut off means is preferably a button that the user can push which causes a second transmitter to send a second signal back to the heating apparatus. The second signal is received by the heating apparatus which activates the relay to de-energize the heating apparatus.

It should be understood that the reminder may be a visual notification or an audible notification. Thus, the remote receiver may include one or more speakers so that the reminder is loud enough to alert a user that may not be near the remote receiver. The audible waves of the reminder may have a frequency and amplitude of a typical fire alarm. However, other embodiments are contemplated. Of course, the remote receiver may include both audible and visual components.

Furthermore, the transmitter may signal to a user that is located completely out of the house that the heating apparatus 110 is located. For example, the transmitter 120 may be configured to automatically notify a user's cell phone, computer, telephone or any other device. In the case that the transmitter 160 contacts a user's cell phone to remind the user, the user may be required to download an application that allows for communication with the remote cooking reminder system 110 in order to remind the user in a similar manner as described herein above.

Although the present invention has been described by way of example, it should be appreciated that variations and modifications may be made without departing from the scope of the invention. Furthermore, where known equivalents exist to specific features, such equivalents are incorporated as if specifically referred to in this specification.

I claim:

1. A remote cooking reminder system for reminding a user of a heating apparatus condition comprising:
   at least one sensor configured to directly activate at least one relay when a heating apparatus is energized and producing heat;
   a transmitter electrically connected to said relay, wherein said transmitter is configured to send a signal when said relay is activated; and
   at least one remote receiver of a residence configured to receive said signal and provide a reminder to the user;
   wherein said at least one remote receiver is located in at least one room separate within the residence from said heating apparatus.

2. The remote cooking reminder system of claim 1, wherein said at least one sensor, said at least one relay, and said transmitter are integrated into said heating apparatus.

3. The remote cooking reminder system of claim 1, wherein said reminder is a light that is turned on when said at least one remote receiver is receiving said signal.

4. The remote cooking reminder system of claim 3, wherein said light is pulsing on and off.

5. The remote cooking reminder system of claim 1, wherein said at least one remote receiver is integrated with at least one existing smoke detector.

6. The remote cooking reminder system of claim 1, wherein said signal is a radio frequency signal.

7. The remote cooking reminder system of claim 1, wherein said at least one remote receiver further comprises a manual shut off means configured to de-energize said heating apparatus.

8. The remote cooking reminder system of claim 1, wherein said at least one relay and said transmitter are housed in a module outside of said heating apparatus, wherein said module is electrically coupled to said heating apparatus.

9. The remote cooking reminder system of claim 1, wherein said at least one sensor is an indicator light that illuminates when said heating apparatus is turned on.

10. The remote cooking reminder system of claim 1, further comprising a switch configured to change said signal from a wireless signal to a hardwired wired signal.

11. A remote cooking reminder system for reminding a user of a heating apparatus condition comprising:
- at least one sensor configured to directly activate at least one relay when a heating apparatus is energized and producing heat;
- a transmitter electrically connected to said at least one relay, wherein said transmitter is configured to send a signal when said at least one relay is activated;
- an internal timer in operable communication with said at least one sensor and said at least one relay, wherein said internal timer is configured to count up starting when said at least one sensor activates said at least one relay; and
- at least one remote receiver of a residence configured to receive said signal and provide a reminder to the user;
- wherein said remote receiver further comprises an output display of said internal timer;
- wherein said at least one remote receiver is located in at least one room separately within the residence from said heating apparatus.

12. The remote cooking reminder system of claim 11, wherein said reminder is a light that is turned on when said at least one remote receiver is receiving said signal.

13. The remote cooking reminder system of claim 12, wherein said light is pulsing on and off.

14. The remote cooking reminder system of claim 11, wherein said at least one remote receiver is integrated with at least one existing smoke detector.

15. The remote cooking reminder system of claim 11, wherein said signal is a radio frequency signal.

16. The remote cooking reminder system of claim 11, wherein said at least one remote receiver further comprises a manual shut off means configured to de-energize said heating apparatus.

17. The remote cooking reminder system of claim 12, wherein said at least one relay, said transmitter, and said internal timer are housed in a module outside of said heating apparatus, wherein said module is electrically coupled to said heating apparatus.

18. The remote cooking reminder system of claim 17, wherein said module further comprises a switch configured to change said signal from a wireless signal to a hardwired signal.

19. The remote cooking reminder system of claim 11, wherein said at least one sensor is an indicator light which turns on when said heating apparatus is energized.

20. The remote cooking reminder system of claim 11, further comprising a switch configured to change said signal from a wireless signal to a hardwired signal.

* * * * *